United States Patent [19]

Bernauer

[11] Patent Number: 5,080,875
[45] Date of Patent: Jan. 14, 1992

[54] PROCESS AND APPARATUS FOR THE PURIFICATION OF HYDROGEN GAS

[75] Inventor: Otto Bernauer, Moers, Fed. Rep. of Germany

[73] Assignee: HWT Gesellschaft für Hydrid-und Wasserstofftechnik m.b.H., Mülheim, Fed. Rep. of Germany

[21] Appl. No.: 473,674

[22] Filed: Feb. 1, 1990

Related U.S. Application Data

[63] Continuation-in-part of Ser. No. 267,189, Nov. 4, 1988, abandoned.

[30] Foreign Application Priority Data

Nov. 4, 1987 [DE] Fed. Rep. of Germany ....... 3737843

[51] Int. Cl.$^5$ .............................. C01B 3/00; B01J 8/04
[52] U.S. Cl. ..................... 423/210; 422/190; 422/206; 423/248; 423/658.2
[58] Field of Search ............. 423/248, 658.2, 210; 422/190, 206

[56] References Cited

U.S. PATENT DOCUMENTS

| | | | |
|---|---|---|---|
| 3,793,435 | 2/1974 | Reilly et al. | 423/248 |
| 4,108,605 | 8/1978 | Billings | 423/248 |
| 4,360,505 | 11/1982 | Sheridan et al. | 423/658.2 |
| 4,402,187 | 9/1983 | Golben et al. | 423/248 |
| 4,444,727 | 4/1984 | Yanagihara et al. | 423/658.2 |
| 4,668,424 | 5/1987 | Sandrock | 423/248 |

FOREIGN PATENT DOCUMENTS

| | | |
|---|---|---|
| 3210381 | 5/1983 | Fed. Rep. of Germany . |
| 3151712 | 6/1984 | Fed. Rep. of Germany . |
| 78401 | 6/1981 | Japan ................. 423/248 |
| 38301 | 3/1982 | Japan ............... 423/658.2 |

Primary Examiner—Wayne A. Langel
Attorney, Agent, or Firm—Nils H. Ljungman & Associates

[57] ABSTRACT

A process for the purification of contaminated hydrogen gas which involves, first, subjecting the hydrogen gas to a preliminary purification with a hydride-forming material which has a low hydrogen storage capacity to remove substantially all of the contaminants, followed by a primary purification of the hydrogen gas with a hydride-forming material which has a high hydrogen storage capacity, thereby extending the useful life of the hydride-forming material which has the high hydrogen storage capacity.

20 Claims, 3 Drawing Sheets

GAS ANALYSIS OF DISCHARGED HYDROGEN FROM
THE LARGE-SCALE STORAGE FACILITY

FIG. 3

PROCESS AND APPARATUS FOR THE PURIFICATION OF HYDROGEN GAS

CROSS REFERENCE TO RELATED APPLICATION

This application is a continuation in part of abandoned application Ser. No. 07/267,189, entitled "Process and Apparatus for the Purification of Hydrogen Gas," which was filed Nov. 4, 1988 in the name of Otto Bernauer, the inventor herein, and abandoned in Sept. 1, 1989.

BACKGROUND OF THE INVENTION

1. Field of the Invention:

This invention relates to a process for the purification of hydrogen gas with a cyclical charging and discharging of metal hydride reservoirs as described herein, and to an apparatus for the execution of this process.

2. Description of the Prior Art:

The prior art describes hydride reservoirs for the purification of contaminated hydrogen gas. Use is made of the fact that a reservoir mass consisting of a hydride-forming metal, when charged with hydrogen, absorbs the hydrogen portion and binds it in the metal matrix, while the impurities are either chemisorbed on the surface or remain unbonded. A relatively pure gas is then obtained by releasing the hydrogen when the reservoir is discharged.

The concentration of the hydrogen in the reservoir mass is a function of the temperature and the gas pressure. When the hydride reservoir is charged, heat is released (enthalpy of formation). Conversely, when the reservoir is discharged, heat is required to drive the hydrogen out of the hydride material. Conventional systems are used to heat and cool the reservoir. That means, for example, the use of naturally-occurring surface or ground water for cooling, and the use of fossil fuels for heating. The energy consumed is on the order of 0.5 kWh/m3 of hydrogen, and therefore represents a significant operating cost factor.

U.S. Pat. No. 3,516,263 relates to such a process for purifying hydrogen through absorbtion and desorption by employing a reversible metal hydride forming reaction.

U.S. Pat. No. 4,444,727 relates to a hydrogen purification system which includes two metal hydride reservoirs working in alternation. The two hydride reservoirs are each equipped with a heat exchanger, and are coupled to one another for the purpose of mutual heat exchange. In other words, the heat released during the charging of one hydride reservoir with raw hydrogen gas is conducted via the two heat exchangers and the system of lines connecting them to the other hydride reservoir, which is being discharged and therefore requires a corresponding amount of heat to release the pure hydrogen gas. This solution substantially reduces the energy consumption for hydrogen purification.

This purification installation, however, is unsatisfactory from several points of view. One particular disadvantage is that the reservoir mass of both hydride reservoirs becomes more contaminated with every charge/discharge cycle by chemisorption of certain impurities in the raw hydrogen gas, so that its purification capacity decreases steadily over time, until it becomes completely unusable. After a certain period of operation, therefore, it becomes necessary to replace both hydride reservoirs.

Another disadvantage is that, before the first charging of the hydride reservoir with raw hydrogen, the reservoir volume must be evacuated and thereby freed of impurities. After any discharge, however, impurities remain which are not absorbed by the reservoir mass, and are contained in the so-called "pure" gas discharged. This is due to the fact that no precautions have been taken to otherwise remove the contaminated top gas at the beginning of a discharge cycle, and only after the hydride reservoir has been flushed with released hydrogen gas is genuinely high-grade pure hydrogen gas actually discharged to the hydrogen consumers.

For this reason, the quality of the pure gas fluctuates during a cycle. If one wishes to eliminate this shortcoming and provide corresponding devices to remove the contaminated top gas, then another shortcoming becomes apparent: During the release of the top gas, both hydride reservoirs may have to be discharged simultaneously, so that heat must be supplied to both of them simultaneously. But at least in this phase, that destroys the basic operating principle of the mutual heat exchange proposed by U.S. Pat. No. 4,444,727, with the result that, at least temporarily, the continuous delivery of pure gas cannot be guaranteed. To eliminate this disadvantage, there can, for example, be a pure gas buffer reservoir or a significant oversizing of the hydride reservoir. In the latter case, only as much of the actual capacity of the hydride reservoir being discharged is used, so that in spite of the absence of heat supplied during the discharge of the top gas from the other hydride reservoir and the consequent drop in the reservoir temperature, sufficient quantities of hydrogen with a sufficient discharge pressure can be provided. Both solutions result in a significant increase in the cost of the purification installation. This is also true for a special variant of a similar purification installation shown in U.S. Pat. No. 4,444,727, in which the heat exchange between the two hydride reservoirs takes place by means of an intermediate heatsink, which, to a certain extent, can be considered a thermal buffer. Such an installation entails additional expense, not only for the heatsink, the connecting lines and the circulation pumps, but also for service and maintenance of these pieces of equipment.

The above-mentioned U.S. Pat. Nos. 4,444,727 and 3,516, 263 are hereby incorporated by reference, as if the entire contents thereof were expressly set forth herein.

OBJECT OF THE INVENTION

A principal object of the present invention is to provide a purification installation of the type in question, in which the disadvantages noted above can be eliminated. In particular, the operation of the purification installation should require no additional (or only a slight additional) heating and cooling capacity.

A further object of the invention is that the expense for fabrication and maintenance of the equipment should be as low as possible, and the service life of the hydride reservoirs should not be shortened by reactive gas components. Moreover, a continuous delivery of hydrogen gas with a uniformly high degree of purity of at least 100 ppb should be guaranteed at all times.

SUMMARY OF THE INVENTION

These and other objects are achieved by means of the process described herein. An advantageous refinement of the process is also described, as are an apparatus for the performance of the process and various advantageous refinements of the apparatus.

The present invention makes it possible to add either no thermal energy at all from outside, or only very small amounts, during the operation of the purification system itself (hydride reservoirs). Additionally, no electrical heating connection may be necessary. The total energy consumption for purification of hydrogen approaches zero, if we overlook the current consumption for control and regulation.

This is achieved by the fact that the hydride reservoir is surrounded by a heat transfer medium (e.g. water), which is very effectively thermally insulated from the outside. The heat released during the charging of the hydrogen is transmitted to the water and heats both the water and the hydride reservoir itself. The volume of water is appropriately determined so that when the hydride reservoir is completely charged, the heat released can be absorbed by the water. The temperature increase is a function of the charging pressure and the selection of the hydride-forming material employed.

The charging is then terminated when the hydride temperature and the temperature of the heat transfer medium have become largely equal to one another, i.e. when they differ by no more than a specified maximum temperature differential. The time required for charging is essentially determined by the quality of the heat exchange between the reservoir and the water. In practice, times of up to 2 minutes are feasible, so that extremely high hydrogen throughputs are possible per unit of time.

After the conclusion of the charging, the energy required for the discharge is stored in the heatsink medium and in the hydride reservoir. The hydride reservoir can be discharged without the application of external energy. The discharge times are again a function of the rapidity of the heat exchange and, in the extreme case, can be in the range of one minute. Only if an alloy is selected as the hydride material, for which the discharge pressure at the ambient temperature, even above the specified discharge limit (residual concentration of hydrogen in the reservoir mass), is lower than the required operating pressure on the pure gas side, will a low power make-up heater be required, to compensate for the heat losses which occur in spite of the thermal insulation.

The discharge is terminated when the temperatures of the hydride material and the heatsink medium have become largely equal, i.e., when a specified temperature gradient drops below a specified point. Under these conditions, the hydride reservoir is then available for repeated charging. A particular advantage of the invention, in addition to the energy saving, is that all the water valves and water lines for heating and cooling are no longer necessary. Thus, not only the related investment costs, but also the required service and maintenance costs, are eliminated which, taken together, represent an important cost factor.

Since the heat exchange is limited to the immediate vicinity of each hydride reservoir, i.e., the heat is transmitted only a short distance in each case, a very rapid heat exchange is also possible. This makes possible the rapid charging and discharging of the hydride reservoir and thus leads to a corresponding increase in the throughput of the purification installation.

The process according to the invention and the apparatus for its execution includes a pre-purification stage for the raw hydrogen gas, before it is conducted to the hydride reservoirs. In the pre-purification stage, those impurities which have an adverse effect on the life of the hydride reservoir material are filtered out, converted or absorbed. Suitable getter materials for this purpose include hydride-forming metals such as alloys, in which the hydride formation only begins significantly above the maximum pressure which can occur in the purification installation. This means that, during the purification operation, no hydride formation takes place on this getter material. Instead, however, other components of the raw hydrogen gas are chemisorbed by the getter material, and therefore can no longer lead to a premature contamination of the reservoir mass in the purification stage itself. Thus, a long-term operation of the hydride reservoir of the purification stage is guaranteed. The unbonded remaining impurities of the raw gas are flushed out of the hydride reservoir, according to the invention, by a ventilation of the so-called top gas at the beginning of a discharge phase, so that thereafter only high-purity hydrogen gas is delivered, which, without any additional treatment, can have a very high degree of purity (for example, less than 10 ppt impurities). From time to time, the getter material must be replaced with fresh material, as a function of the quality of the raw gas and the purity required for the pure gas, like a "consumable anode" in corrosion protection.

The effort and expense required for such a replacement, however, is much less than for a replacement of contaminated hydride reservoirs in the principal purification stage. With an appropriate design, the replacement can even be made during the operation of the installation, without interrupting the delivery of pure gas.

The invention is explained in greater detail below, with reference to the schematic diagram of an installation for hydrogen purification illustrated in the accompanying figure.

One aspect of the invention resides broadly in a process for the purification of hydrogen gas, said process comprising the steps of: contacting the hydrogen gas with a first hydride-forming material at a first operating temperature and at a first operating pressure: and thereafter, contacting the hydrogen gas with a second hydride-forming material at a second operating temperature and at a second operating pressure: wherein said first hydride-forming material, said first operating temperature and said first operating pressure, and said second hydride-forming material, said second operating temperature and said second operating pressure are chosen such that: during the contacting of the hydrogen gas with said first hydride-forming material, said first hydride-forming material is reacted with the hydrogen up to or less than a first selected percentage of the hydride-forming capacity of said first hydride-forming material; and during the contacting of the hydrogen gas with said second hydride-forming material, said second hydride-forming material is reacted with the hydrogen up to at least a second selected percentage of the hydride-forming capacity of said second hydride-forming material; and wherein said first selected percentage is less than said second selected percentage.

DETAILED DESCRIPTION OF THE PREFERRED EMBODIMENT

Figure 1:
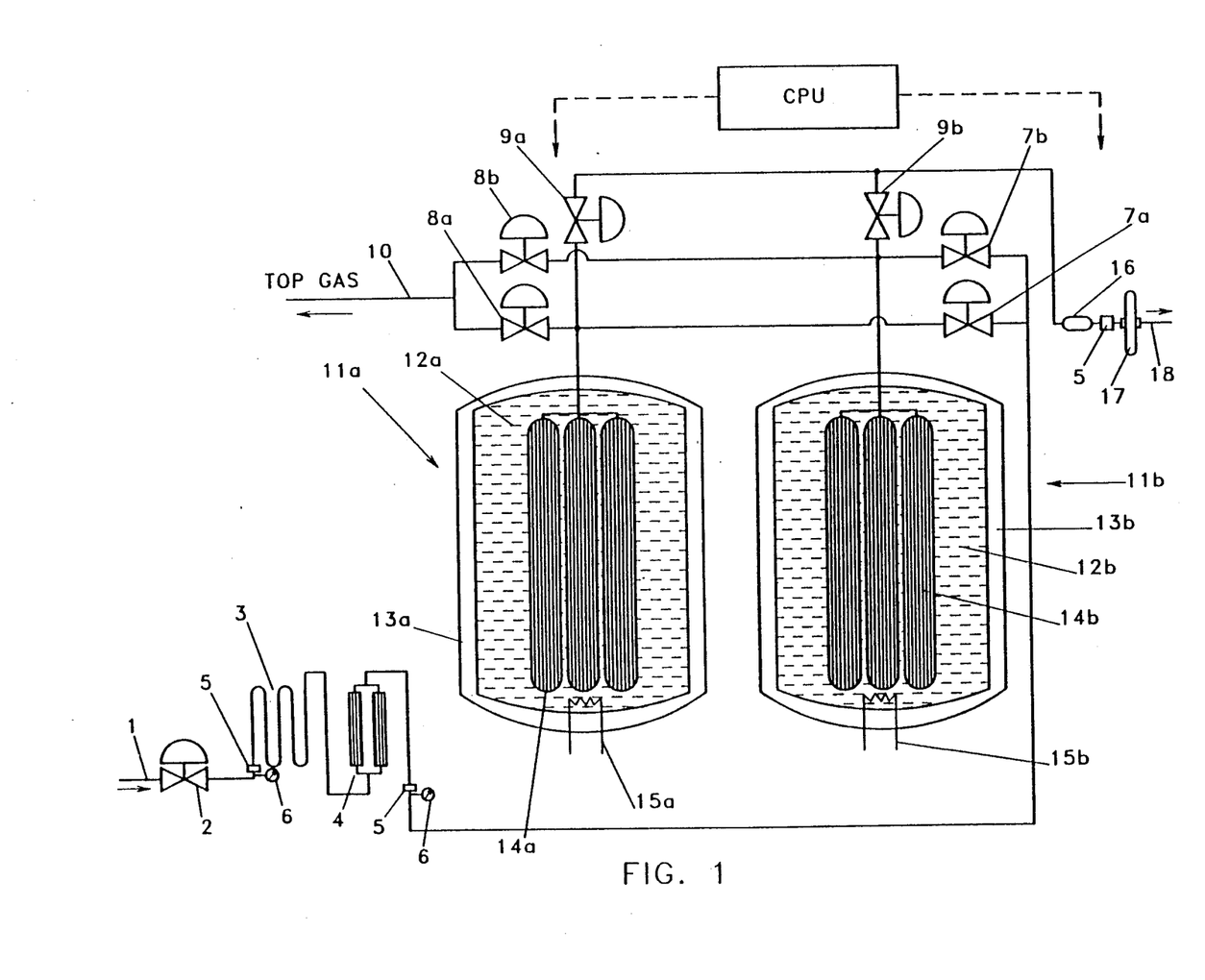
FIG. 1 is a schematic diagram of one embodiment of a hydrogen gas purification apparatus configured and operated according to the present invention.

From a storage vessel (not shown), impure hydrogen gas is made available at a pressure, for example, of 10 bar, and, after opening the valve 2, is introduced through the feed line 1 into a pre-purification stage comprising a molecular screen 3 and a getter stage 4, where the moisture content and the concentration of reactive gas constituents are reduced. At the same time, the pre-purification stage 3, 4 acts as a catalytic reactor for carbon monoxide, and converts the latter substance into hydrocarbon, which is easier to eliminate. The gas pressure and the moisture content of the hydrogen are monitored by means of corresponding measurement equipment 5, 6. After leaving the pre-purification stage, the hydrogen gas is introduced into the hydride reservoir 11a, for example, and stored there in the form of metal hydride.

With increasing reservoir charging, the temperature in the hydride reservoir 11a increased to a maximum. The hydride reservoir 11a, whose storage volume is formed by three interconnected individual pressure vessels 14a, is surrounded by a heatsink medium 12a (e.g. water), which absorbs the essential portion of the formation enthalpy of the metal hydride. Since the hydride reservoir 11a is equipped with effective thermal insulation 13a, the heat released is not transmitted to the environment.

When the maximum temperature is reached in the hydride reservoir 11a and in the heatsink 12a, the charging is terminated, and the hydrogen feed is shut off by means of a shut-off valve 7a. During the charging, the outlet valves 8a and 9a, which are part of the hydride reservoir 11a, are closed. Since the hydride material absorbs only the hydrogen, the foreign components remain in the gas chamber of the hydride reservoir 11a.

This contaminated hydrogen gas, called top gas, is therefore exhausted at the beginning of the reservoir discharge cycle via the line 10, after the opening of the valve 8a, and is not conducted into the pure gas line 18. Only when the top gas has been removed and the valve 8a opened for that purpose has been closed again, is the valve 9a to the pure gas line 18 opened, so that the pure hydrogen can be extracted, after it has passed through the filters 16 and 17. The heat required for the discharge is continuously extracted from the heatsink 12a. With falling temperature, the discharge pressure of the pure hydrogen gas also drops. As soon as the hydride reservoir 11a and the heatsink 12a have returned to the initial temperature, i.e., as soon as the quantity of stored hydrogen has been released, the discharge is terminated. At this point (e.g., of termination), the discharge pressure may be on the order of 5 bar, for example. A second hydride reservoir 11b located parallel to the hydride reservoir 11a, the parts of which have been identified with the same reference numbers and letter b instead of letter a, works in alternating cycles during the charging and discharging cycle.

That means that the hydride reservoir 11a is charged just when the hydride reservoir 11b is discharged and vice-versa, so that a continuous extraction of pure hydrogen gas is possible. The overall installation, including the necessary valves, is monitored and controlled by a programmable control system (shown schematically as a "CPU").

If the hydride material does not deliver a sufficient discharge pressure at the ambient temperature, the hydride reservoirs 11a and 11b may be equipped with a make-up heater 15a, 15b, to compensate for the slight heat loss experienced in spite of the thermal insulation.

The continuous extraction of pure gas is also guaranteed during the removal of the top gas which takes place at the beginning of the discharge of a hydride reservoir 11a, since the other hydride reservoir 11b in this phase can still provide pure gas at a sufficient discharge pressure. During this transitional phase, therefore, both hydride reservoirs 11a and 11b are discharged simultaneously. That is possible because the heat required for the hydride reservoir discharge is available at all times for each of the two hydride reservoirs 11a, 11b in its own heatsink 12a, 12b. Thus the thermal economy of the two participating hydride reservoirs 11a, 11b is completely independent, so that in this respect, a completely different process and apparatus principle is applied than in the hydrogen purification installation disclosed in U.S. Pat. No. 4,444,727. The solution according to the invention is based on the principle that the external vessel jacket (thermal insulation 13a, 13b) which carries the flow of a heat transfer medium 12a, 12b, which flows very easily, effecting a heat exchange with the reservoir mass, is sized so that it acts as a heatsink, and can absorb the entire bonding formation enthalpy (or heat of formation) from the reservoir charging. It is thus possible to completely eliminate pipelines, pumps and valves to control the feed and discharge of the heat transfer medium.

The design of a hydrogen purification installation according to the invention is explained below with reference to the following mathematical example, on the basis of a hydride reservoir with a 7.5 kg storage mass, whose reversible storage capacity for hydrogen is 1.2 wt. %. The total weight of the reservoir, including the pressure vessel, is 13.5 kg. The hydride reservoir is enclosed in a water tank with an 8 kg charge of water, which is externally insulated with a vacuum super insulation, so that there is practically no heat lost to the environment.

To improve the thermal conductivity between the water and the vessel wall, fins made of material which conducts heat well may be located on the outer surface of the hydride reservoir; these fins being immersed in the water. As the hydride reservoir is charged with hydrogen, it heats up from room temperature to a temperature which is a function of the charging pressure. In this example, it increased by 40K over the starting temperature. The heat thereby released equals:

$$Q = n_{H2} \times H_{hydride} = 1620 \text{ kJ}$$

with the assumption that the hydrogen conversion $n_{H2} = 90$ g corresponding to 45 mol, and the hydride formation enthalpy $H_{hydride} = 36$ kJ/mol $H_2$. As a result of the heat released, the total system is heated by approximately 40K, according to the following equation:

$$\Delta T = \frac{Q_{total}}{C_{phydride\ reservoir} \times m_{hydride\ reservoir} + C_{pwater} \times m_{water}}$$

For the selected example:

Heat capacity of the hydride reservoir
$C_{phydride\ reservoir} = 0.54$ kJ/kg K.

Mass of hydride reservoir
$m_{hydride\ reservoir} = 13.5$ kg

Heat capacity of water
$C_{pwater} = 4,184$ kJ/kg K.

Mass of water
$n_{water} = 8$ kg

Temperature increase $\Delta T = 40$ K.

During the subsequent discharge, the hydride reservoir cools to a temperature which is a function of the discharge pressure, and the heat required for the hydrogen release flows from the heatsink medium (water). In the present example, with 7.5 kg hydride material, the charging and discharging times of the system (reservoir diameter 114 mm, reservoir height 320 mm, hydride material: $Ti_{0.85}$, $Zr_{0.15}$, $V_{0.45}$, $Fe_{0.1}$, $Mn_{1.5}$) is approximately 10 minutes, so that an hourly production of 3 $Nm^3$ of purified hydrogen is possible.

If it is necessary to cover long down times of the purification installation, and at the same time to have full operational capacity, the installation can be equipped with a make-up heating system, which compensates for the heat loss resulting from less than ideal thermal insulation. In the example described, the heat loss is on the order of 10 W. The energy consumption required is therefore insignificant, compared to the output of the installation.

Figure 2:
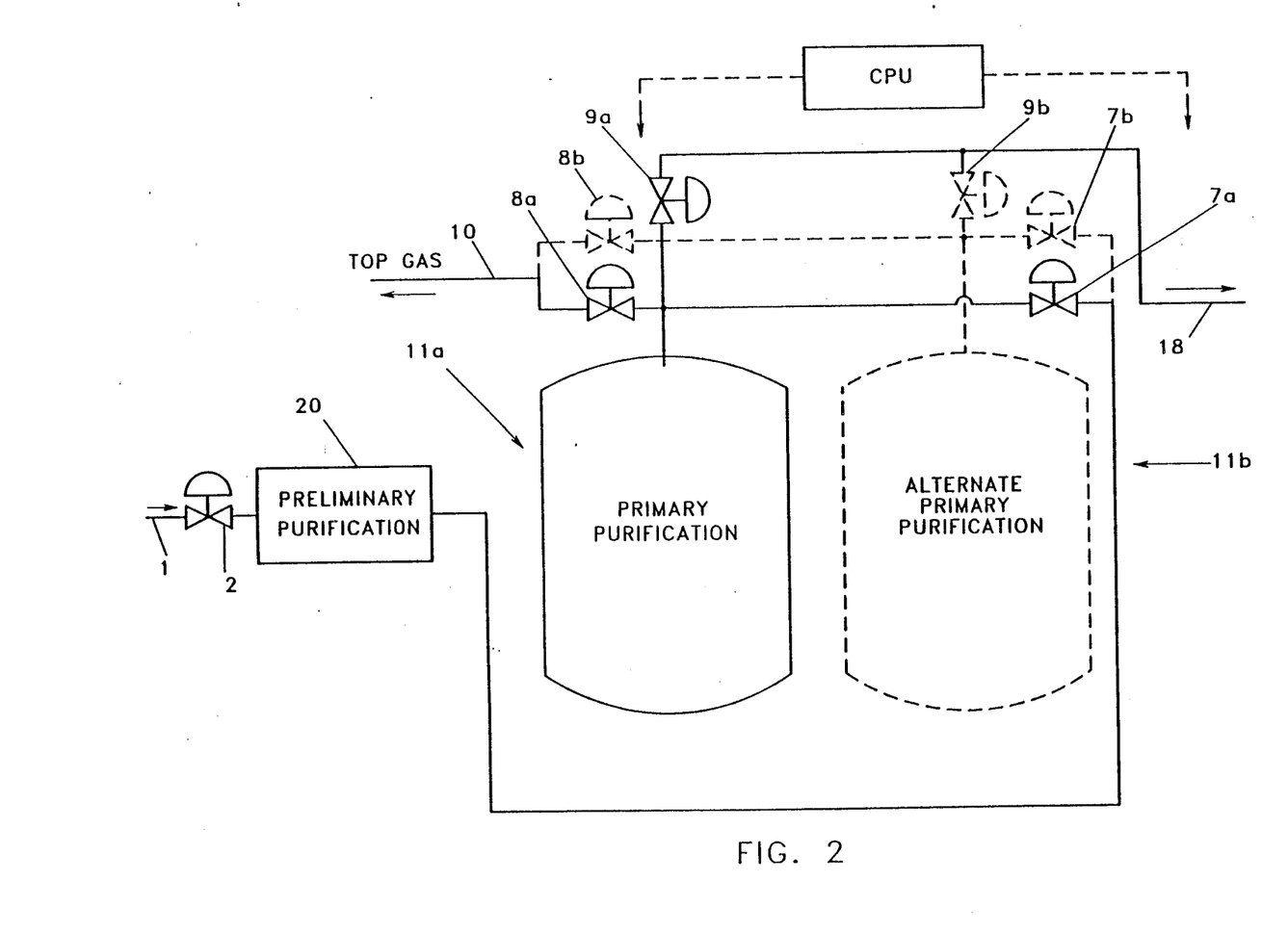
FIG. 2 is a schematic diagram of another embodiment of a hydrogen gas purification apparatus configured and operated according to the present invention.

A particularly preferred embodiment of the invention, which employs a preliminary purification stage 20, is shown in FIG. 2. In FIG. 2, similar reference numerals have been used to those employed in FIG. 1, and while certain elements have not been explicitly shown, such as, for example, molecular screen 3, getter stage 4, measurement equipment 5 and 6 and filters 16 and 17, these elements not being essential to the practice of the invention, it should be understood that these elements shown in the embodiment of FIG. 1 can also be employed in the embodiment shown in FIG. 2.

Additionally, the hydride reservoirs 11a and 11b are shown only in outline form in FIG. 2, since it is not necessary for practice of the FIG. 2 embodiment that the particular hydride reservoir construction shown in FIG. 1 and having an enclosed heatsink medium 12a and/or 12b be employed in the embodiment shown in FIG. 2. Rather, any of the cyclically charged hydride reservoirs known in the art may be utilized for the hydride reservoirs 11a and 11b in the embodiment shown in FIG. 2.

However, in an even more preferred embodiment of the invention, the preliminary purification stage 20 of FIG. 2 is employed in conjunction with either one or both of the hydride reservoirs 11a and 11b having enclosed heatsink mediums 12a and 12b shown in FIG. 1. That is, in this embodiment, the primary purification stage 11a of FIG. 2 (and, optionally, the alternative primary purification stage 11b of FIG. 2 are, preferably, the hydride reservoirs 11a and 11b, respectively, shown in FIG. 1.

Moreover, it is not necessary that two separate parallel hydride reservoirs be alternately operated, since the primary purpose of such an arrangement is to provide a continuous flow of purified hydrogen gas. Therefore, hydride reservoir 11b is shown in phantom, in order to indicate it as being unessential to the practice of the invention shown in the FIG. 2 embodiment.

A particularly important aspect of the embodiment of the invention shown in FIG. 2 is the provision of a preliminary purification stage 20, the hydride-forming material of which bears a particular relationship to the hydride-forming material employed in the primary purification stage 11a (and, optionally, 11b). The preliminary purification stage 20 serves to remove from the hydrogen gas reactive gas components which would degrade over time the performance of the primary purification stage 11a (and, optionally, 11b).

Reactive gas components are considered as being those gases which form chemical bonds with the metal hydride reservoir mass, which bonds are irreversible on the occasion of the reservoir discharge, and which increasingly deactivate the surface of the metal hydride reservoir material for the absorption of hydrogen.

For example, on account of gas components such as oxygen or water, oxides are formed on the surface of the metal hydride reservoir material, which oxides have an adverse effect on the hydrogen storage capacity. Carbon monoxide is another frequently occurring reactive gas component. A carbon monoxide concentration of only 50 ppm appears to cause a 50% reduction in the hydrogen storage capacity after only 50 charge/discharge cycles. To ensure a sufficient purification action, therefore, the metal hydride reservoir mass must be replaced with fresh material or be regenerated when it reaches a specified contamination limit. This is a very complex and expensive process, since the metal hydride reservoir, which has a relatively expensive container structure (e.g., heat exchange surfaces, internal components, high safety requirements, etc.), must be dismantled. One object of the invention shown in FIG. 2 is, therefore, the provision of a process and arrangement which makes it possible to leave the metal hydride reservoir mass used for the hydrogen purification in the hydride reservoir for a long period of time, without, however, risking its deactivation by reactive gas components.

This object is achieved by first subjecting the hydrogen gas to be purified to a preliminary purification, in which the reactive gas components are eliminated from the gas current. For that purpose, according to the invention, the hydrogen gas current is transported, before its introduction into the metal hydride reservoir of the principal purification stage, over another metal hydride reservoir material contained in the preliminary purification stage 20 shown in FIG. 2, the characteristics of which differ significantly from the characteristics of the metal hydride reservoir material of the principal purification stage in which the cyclical charging and discharging take place.

While at the specified operating pressure of the purification facility and the temperature of the coolant available in the reservoir charging phase (e.g., typically 20° C. or less), the metal hydride reservoir material of the principal purification stage can be charged at least up to 80% of its maximum possible hydrogen charging capacity, the hydride reservoir material of the preliminary purification stage is preferably selected such that, at ambient temperature (or at a higher operating temperature) and at the specified operating pressure, it has a hydrogen storage capacity which is preferably less than 20% and even more preferably less than 10% of its maximum hydrogen storage capacity.

As a result, the preliminary purification stage, under the specified operating conditions, binds only a little hydrogen gas, and this gas is retained for the entire operating time of the facility. This is important in order that as much of, or at least a major portion of, the gas storage capacity of the hydride reservoir material of the preliminary purification stage as possible is available for the absorption of the reactive gas components which are to be eliminated. A high concentration of hydrogen in this material would, accordingly, have an adverse effect on the absorption capacity.

An important aspect of the invention is, therefore, the coordinated selection of the hydride reservoir materials for the two purification stages. Like a so-called "consumable anode" in corrosion protection, the metal hydride reservoir material of the preliminary purification stage is available in the sense of a "consumable material" for bonding the reactive gas components. As soon as the concentration of reactive gas components in the preliminary purification stage has reached a level which excessively reduces its effectiveness, the preliminary metal hydride reservoir material is replaced with fresh or regenerated material. This process is significantly less complex and expensive than the previously necessary replacement of the principal purification stage. This is due, in particular, to the following:

The decrease of the hydrogen storage capacity would directly reduce the "breathing space" (e.g., the hydride-forming capacity) of the principal purification stage of the facility. That would have a particularly disadvantageous effect on the restriction of the purification capacity of the facility, because a portion of the "breathing space" of the hydride reservoir of the principal purification stage is lost anyway during each discharge cycle, due to the fact that, before the extraction of pure hydrogen, the contaminated so-called "top gas" (which is still in the pressure vessel) is flushed out. In the preliminary purification stage, on the other hand, no cyclical charging and discharging with hydrogen takes place. Rather, the flow of gas through this stage is continuous. A reduction of the hydrogen storage capacity in the preliminary purification stage is, therefore, initially insignificant, since in this stage, strictly speaking, no hydrogen at all is stored. All that is necessary is that sufficient reactive metal hydride reservoir material be available to bond the reactive gas components. Further, the present invention has discovered that, in the preliminary purification stage, the contamination with reactive gas components may be higher than would be allowable in the principal purification stage from the point of view of the hydrogen storage capacity. Therefore, the material used for the preliminary purification need be replaced relatively less frequently.

Additionally, the metal hydride reservoir material of the preliminary purification stage can be produced more economically than the metal hydride reservoir material utilized for the principal purification stage, on account of the cheaper raw material and the significantly lower quality requirements.

Moreover, the pressure vessel used for the preliminary purification stage 20 has a significantly less complicated construction, because, for example, no measures need to be taken to ensure a rapid heat exchange to accelerate a charging and discharging of the reservoir. Since the vessel is not exposed to cyclically alternating stresses, it is possible to completely do away with the internal structures which are designed to prevent local overloads caused by the volume changes of the metal hydride reservoir mass during charging and discharging. In other words, it is possible to use a simple bulk reactor.

The hydride reservoir material for the preliminary purification stage can consist of an alloy as disclosed by DE-PS 32 10 381. However, the ranges disclosed there for the alloy elements are preferably to the ranges described and claimed herein.

Additionally, the hydride reservoir material for the principal purification stage can be selected from the alloys disclosed in DE-PS 31 51 712.

WORKING EXAMPLE

In a comparison test in a gas purification facility, a raw hydrogen gas containing the following impurities was treated according to the conventional process without preliminary purification:

2 vpm O2
20 vpm N2
2 vpm H2O
80 vpm Ar
2 vpm hydrocarbons

The facility used for the purification had two parallel metal hydride reservoirs which operated in mutually alternating charge and discharge cycles. The storage masses in the metal hydride reservoirs had the following composition:

$Ti_{0.95} Zr_{0.15} V_{0.4} Ni_{0.1} Mn_{1.35}$

Figure 3:
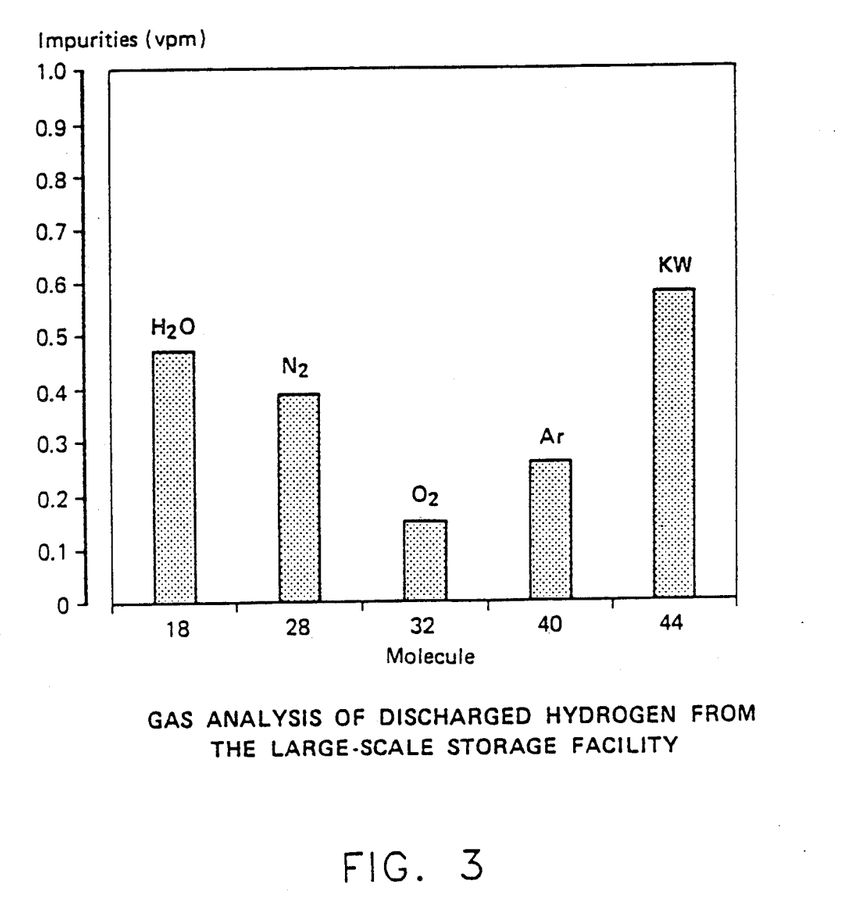
FIG. 3 is a chart showing the purity of hydrogen gas produced by the embodiment of the invention shown in FIG. 1.

The purification facility was operated at a hydrogen charging pressure (operating pressure) of approximately 10 bar. The coolant to remove the heat during charging had a temperature of 20 degrees C., so that a reservoir charge of approximately 1.6 wt. % with hydrogen was achieved. The maximum possible hydrogen storage capacity in this material has approximately 1.8 wt.%, and was therefore approximately 90% utilized under the selected operating conditions. For discharge, a heat source was used which supplied a heating medium at approximately 60 degrees C. The composition of the relatively pure hydrogen gas produced is illustrated in FIG. 3 entitled "Gas Analysis of Discharged Hydrogen."

An extrapolation indicated that, with continuous operation of this facility, on account of the irreversible absorption of reactive impurities in the metal hydride reservoir mass, the hydrogen storage capacity of this purification facility with the raw hydrogen gas used would have dropped to approximately one-half of the original value after a maximum of 5 years. Simultaneously, the dynamics of the metal hydride reservoir (e.g., increase in the amount of time required for charging and discharging) would have been so adversely affected by the impurities that only about 30% of the original pure gas throughput would be possible. In other words, at this point or even earlier, the purification facility would have to be replaced with a completely new facility.

To illustrate the effectiveness of the process according to the invention, this facility was operated in an additional test with a preliminary purification stage before the principal purification stage. In the preliminary purification stage, the gas components which are harmful to the metal hydride reservoir material of the principal purification stage were eliminated. For the preliminary purification, a loose bed of a finely-divided alloy having the following composition was used in a continuous reactor:

$Ti\ V_{0.4}\ Fe_{0.1}\ Cr_{0.05}\ Mn_{1.55}$

Under the specified operating conditions (approximately 20 bar, 20 degrees C.), a hydrogen charge of approximately 0.2 wt. % was obtained, which is less than 10% of the maximum possible charging capacity (approximately 2.1 wt. %). A higher temperature would have limited the charging in the preliminary purification stage to even lower values, and thus further increased the purification action with regard to reactive gas components. However, that would have been achieved at the cost of a higher energy input. The same is true for the temperature control of the principal purification stage, in which on account of a lower coolant temperature (during charging), and a higher heat source temperature (during discharging), an even more effective utilization of the hydrogen storage capacity would be possible.

The pure hydrogen gas produced according to the invention utilizing the preliminary purification stage 20 has a significantly higher purity than the pure gas produced in the comparative test, since total impurities were less than 0.1 vpm. An extrapolation indicates that, with continuous operation and the use of the same raw hydrogen gas, this facility would still have at least 95% of the original hydrogen storage capacity after 5 years of operating time, and 90% of the original pure gas production capacity. To ensure this, it would only be necessary to replace the continuous reactor of the preliminary purification stage, the manufacturing cost of which represents a small fraction of the cost of the overall facility, approximately once a year with a fresh continuous reactor. The time and expense involved in such a replacement are comparatively small. In fact, the metal hydride reservoir material from the old continuous reactor, containing a high level of impurities, can be reprocessed and reused.

In summary, one feature of the invention resides broadly in a process for the continuous purification of hydrogen gas with cyclical charging and discharging of at least two alternately cycled metal hydride reservoirs, whereby in a first phase (reservoir charging), raw hydrogen gas is conducted under pressure to a metal hydride reservoir and is stored in the reservoir mass as metal hydride, and the heat which is formed during the storage (bonding enthalpy) is at least partly extracted by cooling, and whereby in every second operating cycle (reservoir discharge), the hydrogen stored in this metal hydride reservoir is once again released as pure hydrogen gas by the addition of heat to the reservoir mass, characterized by the fact that the purification takes place in at least two successive stages, whereby the raw hydrogen gas, before its introduction into the metal hydride reservoir (principal purification stage), is first subjected to a preliminary purification, in which it is transported through a loose bed of a preliminary purification material, which permanently bonds the gas components of the raw hydrogen gas which are reactive in relation to the reservoir mass of the principal purification stage, that the preliminary purification material used is a metal hydride reservoir material different from the reservoir mass of the principal purification stage, whereby the materials are selected so that at the operating pressure specified for charging the metal hydride reservoir, the metal hydride reservoir of the principal purification stage can be charged with hydrogen up to at least 80% of the maximum possible capacity at the temperature of the coolant used, while the hydride reservoir material of the preliminary purification can be charged up to a maximum of 20% of its maximum possible storage capacity at this operating pressure and at the ambient temperature, that the preliminary purification material is replaced with fresh material before it reaches a level of contamination which would be unacceptable for the effectiveness of the preliminary purification, and that at the beginning of each second work cycle, before the discharge of the pure hydrogen gas, first the contaminated top gas is blown out of the metal hydride reservoir of the principal purification stage to be discharged.

Another feature of the invention resides broadly in a process which is characterized by the fact, that for the metal hydride reservoir material of the principal purification stage, a material is used which, under the specified operating conditions (pressure and temperature), can be charged with hydrogen up to at least 90% of its maximum possible capacity.

Yet another feature of the invention resides broadly in a process which is characterized by the fact that, for the metal hydride reservoir material of the preliminary purification stage, a material is used which, under the specified operating conditions (pressure and temperature), can be charged with hydrogen up to a maximum of 10% of its maximum possible capacity.

A further feature of the invention resides broadly in a process which is characterized by the fact that, for the metal hydride reservoir material of the principal purification stage, an alloy is used which has the following composition (in per cent by weight):
22-25%: Ti
8-13%: Zr
10-14%: V
0-3%: Cr
0-5%: Ni
47-50%: Mn
with the proviso that the following formula must be observed:

$Ti_{1-a}\ Zr_a\ Mn_{2-x}\ Cr_{x-y}\ (V_z\ Ni_{1-z})_y$, wherein the indices lie in the following range of values:
a=0-0.3
x=0.2-1
y=0.2-x
z=0.3-0.9

A yet further feature of the invention resides broadly in a process characterized by the fact that a hydride reservoir material in the principal purification stage is used in which up to 40% of the V-atoms are replaced by Fe-atoms, and up to 10% of the V-atoms by Al-atoms, but in total not more than 40% of the V-atoms by Fe-atoms and Al-atoms together.

Yet another further feature of the invention resided broadly in a process characterized by the fact that an alloy having the following composition is used for the metal hydride reservoir material of the preliminary purification stage (in per cent by weight):
20-25%: Ti
10-12%: V
50-65%: Mn 0–5%: Fe
0–6%: Al
with the proviso that there are more than 2 and up to a maximum of 2.2 additional atoms per Ti-atom.

All, or substantially all, of the components and methods of the various embodiments may be used with at least one embodiment or all of the embodiments, if any, described herein.

All of the patents, patent applications, and publications recited herein, if any, are hereby incorporated by reference as if set for the in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A process for the purification of hydrogen gas containing contaminants by cyclically charging and discharging at least one metal hydride reservoir, said process comprising the steps of:

providing at least one first chamber containing a first hydride-forming material, said first hydride forming material having a maximum hydrogen storage capacity;

maintaining said at least one first chamber at a substantially constant temperature within a first temperature range and a substantially constant pressure within a first pressure range;

said first hydride-forming material being chosen such that said first hydride forming material has within said first temperature range and said first pressure range a hydrogen storage capacity of a first percentage portion of the maximum hydrogen storage capacity of said first hydride-forming material;

substantially continuously flowing the contaminated hydrogen gas through said at least one first chamber to remove a substantial portion of the contaminants by bonding the contaminants on said first hydride forming material to produce at least partially purified hydrogen gas;

bonding said contaminants to said first hydride-forming material over the lifetime of said first hydride-forming material up to a maximum storage capacity of said first hydride-forming material;

providing at least one second chamber containing a second hydride-forming material, said second hydride-forming material having a maximum hydrogen storage capacity;

maintaining said at least one second chamber within a second temperature range and second pressure range;

said second hydride-forming material being chosen such that said second hydride-forming material has within said second temperature range and said second pressure range a hydrogen storage capacity up to a second percentage portion of the maximum hydrogen storage capacity of said second hydride-forming material;

transferring the at least partially purified hydrogen gas from said at least one first chamber to said at least one second chamber;

reacting the hydrogen of the at least partially purified hydrogen gas with said second hydride-forming material to form hydrides, said reacting the hydrogen with said second hydride-forming material generating heat;

extracting at least a portion of the generated heat from said second hydride-forming material to cool said second hydride forming material;

storing the hydrogen of the at least partially purified hydrogen gas by bonding the hydrogen to said second hydride-forming material up to said second percentage portion of the maximum hydrogen storage capacity of said second hydride-forming material within said second temperature range and said second pressure range;

stopping transfer of the at least partially purified hydrogen gas to said at least one second chamber;

discharging contaminated top-gas out of said at least one second chamber;

heating said second chamber to release the hydrogen bound to said second hydride-forming material to thereby produce a pure hydrogen gas; and said first percentage portion of the maximum hydrogen storage capacity of said first hydride forming material being substantially percentially less than said second percentage portion of the maximum hydrogen storage capacity of said second hydride-forming material.

2. The process according to claim 1, wherein:
said first percentage portion of the maximum hydrogen storage capacity of said first hydride forming material is less than about 20%, and
said second percentage portion of the maximum hydrogen storage capacity of said second hydride-forming material is greater than about 80%.

3. The process according to claim 2, wherein:
said first percentage portion of the maximum hydrogen storage capacity of said first hydride forming material is less than about 10%, and
said second percentage portion of the maximum hydrogen storage capacity of said second hydride-forming material is greater than about 90%.

4. The process according to claim 3, wherein:
said second hydride-forming material comprises: 22–25% Ti, 8–13% Zr, 10–14% V, 0–3% Cr, 0–5% Ni, and 47–50% Mn; and
said second hydride forming material has a formula of: $Ti_{1-a}Zr_aMn_{2-x}Cr_{x-y}(V_zNi_{1-z})_y$ wherein a, x, y, and z have value ranges of: a=0–0.3, x=0.2–1, y=0.2-x, and Z=0.3–0.9.

5. The process according to claim 4, wherein said second hydride-forming material has up to about 40% of the V replaced by Fe, and up to 10% of the V replaced by Al, such that the total of Fe and Al does not exceed 40% of the V.

6. The process according to claim 5, wherein:
said first hydride forming material comprises: 20–25% Ti, 10–12% V, 50–65% Mn, 0.–5% Fe, and 0–6% Al; and
the ratio of Ti to the other elements is in a range of about 1:2.0 to about 1:2.2.

7. The process according to claim 6, further including:
operating said at least one second chamber adiabatically by storing heat produced in said second chamber upon said hydride formation in a heat sink, said heat sink being thermally disposed in respect to said second chamber, and thereafter, using the stored heat for said heating of said second chamber;
removing said first hydride-forming material upon said first hydride-forming material becoming substantially saturated with contaminants;

regenerating said first hydride-forming material; and replacing said first hydride-forming material.

8. The process according to claim 7, further including using at least two of said second chambers connected in parallel and being alternately cycled to allow for continuous purification of the at least partially purified hydrogen gas from said first chamber.

9. Apparatus for use in a process for the purification of hydrogen gas, said process comprising the steps of:
   providing at least one flow-through chamber containing a first hydride-forming material;
   maintaining said at least one flow-through chamber at a substantially constant temperature within a first temperature range and a substantially constant pressure within a first pressure range;
   substantially continuously flowing the contaminated hydrogen gas through said at least one flow-through chamber;
   removing at least a substantial portion of the contaminants by bonding the contaminants on said first hydride forming material to produce at least partially purified hydrogen gas;
   providing at least one second chamber containing a second hydride-forming material;
   maintaining said at least one second chamber within a second temperature range and second pressure range;
   transferring the at least partially purified hydrogen gas from said at least one flow-through chamber to said at least one second chamber;
   reacting the hydrogen of the at least partially purified hydrogen gas with said second hydride-forming material to form hydrides, said reacting the hydrogen with said hydride-forming material generating heat;
   extracting at least a portion of the generated heat from said second hydride-forming material to cool said second hydride-forming material;
   binding the hydrogen of the at least partially purified hydrogen gas to said second hydride-forming material;
   stopping transfer of the partially purified hydrogen gas to said second chamber;
   discharging a contaminated top-gas out of said at least one second chamber; and
   heating said at least one second chamber to release the hydrogen bound to said second hydride-forming material;
   said apparatus comprising:
   said at least one flow-through chamber containing said first hydride-forming material, said first hydride-forming material having a maximum hydrogen storage capacity;
   said first hydride-forming material being chosen such that said first hydride-forming material has a hydrogen storage capacity of a first percentage portion of the maximum hydrogen storage capacity of said first hydride-forming material within said first temperature range and said first pressure range;
   said at least one flow-through chamber being configured to operate at said substantially constant temperature within said first temperature range, and said substantially constant pressure within said first pressure range;
   said at least one flow-through chamber having a hydrogen gas input and a hydrogen gas output, and said at least one flow-through chamber permitting substantially free flow of hydrogen from said input to said output;
   said at least one flow-through chamber and said first hydride-forming material comprising means for removing said at least substantial portion of the contaminants from the hydrogen gas as the hydrogen gas containing the contaminants substantially continuously flows through said at least one flow-through chamber;
   said first hydride forming material comprising means for bonding said at least substantial portion of the contaminants to said first hydride-forming material over a lifetime of said first hydride forming up to a maximum storage capacity of said first hydride forming material;
   said at least one second chamber containing said second hydride-forming material, said second hydride-forming material having a maximum hydrogen storage capacity;
   said at least one second chamber being configured to operate within said second temperature range and said second pressure range;
   said second hydride-forming material being chosen such that said second hydride-forming material has within said second temperature range and said second pressure range a hydrogen storage capacity up to a second percentage portion of the maximum hydrogen storage capacity of said second hydride-forming material;
   said second hydride forming material being for forming said hydrides with the hydrogen gas to store the hydrogen gas up to said second percentage portion of the maximum hydrogen storage capacity of said second hydride-forming material within said second temperature range and said second pressure range;
   means for conducting the hydrogen gas from said at least one flow-through chamber to said at least one second chamber; and
   heat sink means being thermally disposed with respect to said at least one second chamber to absorb and retain heat given off during said hydride formation and for providing heat to said at least one second chamber to release the stored hydrogen; and
   said first percentage portion of the maximum hydrogen storage capacity of said first hydride forming material being substantially percentially less than said second percentage portion of the maximum hydrogen storage capacity of said second hydride-forming material.

10. The apparatus according to claim 9, wherein:
   said first percentage portion of the maximum hydrogen storage capacity of said first hydride forming material is less than about 20%, and
   said second percentage portion of the maximum hydrogen storage capacity of said second hydride-forming material is greater than about 80%.

11. The apparatus according to claim 10, wherein:
   said first percentage portion of the maximum hydrogen storage capacity of said first hydride forming material is less than about 10%, and
   said second percentage portion of the maximum hydrogen storage capacity of said second hydride-forming material is greater than about 90%.

12. The apparatus according to claim 11, wherein:

said second hydride-forming material comprises: 22–25% Ti, 8–13% Zr, 10–14% V, 0–3% Cr, 0–5% Ni, and 47–50% Mn; and said second hydride forming material has a formula of: $Ti_{1-a}Zr_aMn_{2-x}Cr_{x-y}(V_zNi_{1-z})_y$ wherein a, x, y, and z have value ranges of: a=0–0.3, x=0.2–1, y=0.2–x, and z=0.3–0.9.

13. The apparatus according to claim 12, wherein said second hydride-forming material has up to about 40% of the V replaced by Fe, and up to 10% of the V replaced by Al, such that the total of Fe and Al does not exceed 40% of the V.

14. The apparatus according to claim 13, wherein:

said first hydride forming material comprises: 20–25% Ti, 10–12% V, 50–65% Mn, 0–5% Fe, and 0–6% Al; and the ratio of Ti to the other elements is in a range of about 1:2.0 to about 1:2.2.

15. A process for the purification of hydrogen gas containing contaminants, said process comprising the steps of:

providing at least one first chamber containing a first hydride-forming material, said first hydride forming material having a maximum hydrogen storage capacity;

maintaining said at least one first chamber at a substantially constant temperature within a first temperature range and a substantially constant pressure within a first pressure range;

said first hydride-forming material being chosen such that said first hydride forming material has within said first temperature range and said first pressure range a hydrogen storage capacity less than about a 20% portion of the maximum hydrogen storage capacity of said first hydride-forming material;

substantially continuously flowing the contaminated hydrogen gas through said at least one first chamber to remove a substantial portion of the contaminants by bonding the contaminants on said first hydride forming material to produce at least partially purified hydrogen gas;

bonding said contaminants to said first hydride-forming material over the lifetime of said first hydride-forming material up to a maximum storage capacity of said first hydride-forming material;

providing at least one second chamber containing a second hydride-forming material, said second hydride-forming material having a maximum hydrogen storage capacity;

maintaining said at least one second chamber within a second temperature range and second pressure range;

said second hydride-forming material being chosen such that said second hydride-forming material has within said second temperature range and said second pressure range a hydrogen storage capacity greater than about an 80% portion of the maximum hydrogen storage capacity of said second hydride-forming material;

transferring the at least partially purified hydrogen gas from said at least one first chamber to said at least one second chamber;

reacting the hydrogen of the at least partially purified hydrogen gas with said second hydride-forming material to form hydrides, said reacting the hydrogen with said second hydride-forming material generating heat;

extracting at least a portion of the generated heat from said second hydride-forming material to cool said second hydride forming material;

storing the hydrogen of the at least partially purified hydrogen gas by binding the hydrogen gas to said second hydride-forming material up to said 80% portion of the maximum hydrogen storage capacity of said second hydride-forming material within said second temperature range and said second pressure range;

stopping transfer of the at least partially purified hydrogen gas to said at least one second chamber;

discharging a contaminated top-gas out of said at least one second chamber; and heating said at least one second chamber to release the hydrogen bound to said second hydride-forming material to thereby produce pure hydrogen gas.

16. The process according to claim 15, wherein:

the hydrogen storage capacity of said first hydride forming material is less than about a 10% portion of the maximum hydrogen storage capacity of said first hydride-forming material, and the hydrogen storage capacity of said second hydride-forming material is greater than about a 90% portion of the maximum hydrogen storage capacity of said second hydride-forming material.

17. The process according to claim 16, wherein:

said second hydride-forming material comprises: 22–25% Ti, 8–13% Zr, 10–14% V, 0–3% Cr, 0–5% Ni, and 47–50% Mn; and said second hydride forming material has a formula of: $Ti_{1-a}Zr_aMn_{2-x}Cr_{x-y}(V_zNi_{1-z})_y$ wherein a, x, y, and z have value ranges of: a=0–0.3, x=0.2–1, y=0.2–x, and z=0.3–0.9.

18. The process according to claim 17, wherein said second hydride-forming material has up to about 40% of the V replaced by Fe, and up to 10% of the V replaced by Al, such that the total of Fe and Al does not exceed 40% of the V.

19. The process according to claim 18, wherein:

said first hydride forming material comprises: 20–25% Ti, 10–12% V, 50–65% Mn, 0–5% Fe, and 0–6% Al; and the ratio of Ti to the other elements is in a range of about 1:2.0 to about 1:2.2.

20. The process according to claim 19, further including:

operating said at least one second chamber adiabatically by storing heat produced in said second chamber upon said hydride formation in a heat sink, said heat sink being thermally disposed in relation to said second chamber, and thereafter, using the stored heat for said heating of said second chamber;

removing said first hydride-forming material upon said first hydride-forming material becoming substantially saturated with contaminants;

regenerating said first hydride-forming material; and replacing said first hydride-forming material.

* * * * *

UNITED STATES PATENT AND TRADEMARK OFFICE
CERTIFICATE OF CORRECTION

PATENT NO. : 5,080,875
DATED : January 14, 1992
INVENTOR(S) : Otto BERNAUER

It is certified that error appears in the above-indentified patent and that said Letters Patent is hereby corrected as shown below:

In column 7, line 5, in the equation, delete "$C_{phydride}$" and insert --$C_{p\ hydride}$--.

In column 7, line 10, delete "$C_{phydride}$" and insert --$C_{p\ hydride}$--.

In column 10, line 35, in the composition, delete "Mn1.35" and insert --$Mn_{1.35}$--.

In column 14, line 53, Claim 6, after '50-65% Mn,', delete "0.-5%" and insert --0-5%--.

Signed and Sealed this

Seventeenth Day of May, 1994

BRUCE LEHMAN

Attest:

Attesting Officer

Commissioner of Patents and Trademarks